United States Patent
Chen (10) Patent No.: US 12,250,729 B2
(45) Date of Patent: Mar. 11, 2025

(54) METHOD FOR CONTROLLING POWER RAMPING COUNTER, AND TERMINAL

(71) Applicant: VIVO MOBILE COMMUNICATION CO., LTD., Guangdong (CN)

(72) Inventor: Li Chen, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 503 days.

(21) Appl. No.: 17/225,333

(22) Filed: Apr. 8, 2021

(65) Prior Publication Data

US 2021/0227593 A1    Jul. 22, 2021

Related U.S. Application Data

(63) Continuation of application No. PCT/CN2019/108144, filed on Sep. 26, 2019.

(30) Foreign Application Priority Data

Oct. 10, 2018    (CN) .......................... 201811180377.4

(51) Int. Cl.
*H04W 74/0833*    (2024.01)
*H04L 5/00*    (2006.01)
*H04W 52/36*    (2009.01)

(52) U.S. Cl.
CPC ....... *H04W 74/0841* (2013.01); *H04L 5/0048* (2013.01); *H04W 52/36* (2013.01)

(58) Field of Classification Search
CPC ............. H04W 74/0841; H04W 52/36; H04W 74/004; H04W 52/48; H04W 52/146; H04W 52/50; H04L 5/0048; H04L 5/005
See application file for complete search history.

(56) References Cited

U.S. PATENT DOCUMENTS

2018/0359790 A1    12/2018  Ingale et al.
2019/0342925 A1*   11/2019  Zhang .................. H04W 52/36
2019/0394805 A1*   12/2019  Kim .................. H04W 74/0833
(Continued)

FOREIGN PATENT DOCUMENTS

CN    108112089 A    6/2018
CN    108141749 A    6/2018
(Continued)

OTHER PUBLICATIONS

International Search Report and Written Opinion of the International Searching Authority regarding International Patent Application No. PCT/CN2019/108144, dated Jan. 6, 2020. Translation provided by Bohui Intellectual Property.

(Continued)

*Primary Examiner* — Phirin Sam
*Assistant Examiner* — David Zhijun Sun
(74) *Attorney, Agent, or Firm* — Harness, Dickey & Pierce, P.L.C.

(57) ABSTRACT

A processing method includes: when a random access preamble is transmitted on one or more first carriers, controlling a count value of a power ramping counter according to whether the one or more first carriers change relative to one or more second carriers, where the one or more second carriers are used for transmitting the preamble before the preamble is transmitted on the one or more first carriers.

18 Claims, 3 Drawing Sheets

(56) References Cited

U.S. PATENT DOCUMENTS

2020/0229243 A1    7/2020  Jiang
2020/0252970 A1    8/2020  Jiang
2021/0289557 A1*   9/2021  Ohara ............... H04W 74/0833

FOREIGN PATENT DOCUMENTS

| CN | 108282276 A | 7/2018 |
| CN | 108353331 A | 7/2018 |
| CN | 108370547 A | 8/2018 |
| CN | 109215978 A | 1/2019 |
| EP | 2939496 A1 | 11/2015 |
| EP | 3079431 A1 | 10/2016 |
| WO | WO-2018164478 A1 | 9/2018 |

OTHER PUBLICATIONS

First Office Action regarding Chinese Patent Application No. 201811180377.4, dated Aug. 26, 2020. Translation provided by Bohui Intellectual Property.
"NR Random Access Procedure," Nokia, Alcatel-Lucent Shanghai Bell, 3GPP TSG-RAN WG1#88bis, R1-1704943, Apr. 7, 2017.
Supplementary European Search Report regarding Patent Application No. 19870134.4-1215/3866371; PCT/CN2019/108144, dated Nov. 25, 2021.

* cited by examiner

METHOD FOR CONTROLLING POWER RAMPING COUNTER, AND TERMINAL

CROSS-REFERENCE TO RELATED APPLICATIONS

This application is a Bypass Continuation Application of PCT/CN2019/108144 filed on Sep. 26, 2019, which claims priority to Chinese Patent Application No. 201811180377.4 filed on Oct. 10, 2018, which are incorporated herein by reference in their entirety.

TECHNICAL FIELD

Embodiments of the present disclosure relate to the field of communications technologies, and in particular, to a processing method and a terminal.

BACKGROUND

In a fifth generation (5G) mobile communications technology, new radio (NR) system, in design of a random access channel (RACH), for each time of retransmission of a first message (msg1) of the RACH (that is, a random access preamble), power ramping is supported.

However, in a related art and a related discussion, design of a power ramping counter that is used when reference signals corresponding to multiple preambles change when the multiple preambles are sent is not considered.

SUMMARY

According to a first aspect, an embodiment of the present disclosure provides a data processing method, applied to a terminal. The method includes:
  when a random access preamble is transmitted on one or more first carriers, controlling a count value of a power ramping counter according to whether the one or more first carriers change relative to one or more second carriers, where
  the one or more second carriers are used for transmitting the preamble before the preamble is transmitted on the one or more first carriers.

According to a second aspect, an embodiment of the present disclosure further provides a terminal, including:
  a control module, configured to: when a random access preamble is transmitted on one or more first carriers, control a count value of a power ramping counter according to whether the one or more first carriers change relative to one or more second carriers, where
  the one or more second carriers are used for transmitting the preamble before the preamble is transmitted on the one or more first carriers.

According to a third aspect, an embodiment of the present disclosure provides a terminal, including: a processor, a memory, and a program that is stored in the memory and executable on the processor. When the program is executed by the processor, steps of the processing method according to the first aspect are implemented.

According to a fourth aspect, an embodiment of the present disclosure further provides a non-transitory computer-readable storage medium. The non-transitory computer-readable storage medium stores a computer program. When the computer program is executed by a processor, steps of the processing method according to the first aspect are implemented.

BRIEF DESCRIPTION OF DRAWINGS

According to detailed descriptions to be read in the following optional embodiments, various types of other advantages and benefits will be clear and understandable for a person of ordinary skill in the art. The accompanying drawings are merely used for a purpose of illustrating the optional embodiments, but are not intended to limit the present disclosure. In addition, in all of the accompanying drawings, a same reference symbol is used for representing a same component. In the accompanying drawings.

DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

The term "include" and any other variants in the specification and claims of this application mean to cover the non-exclusive inclusion, for example, a process, method, system, product, or device that includes a list of steps or units is not necessarily limited to those clearly listed steps or units, but may include other steps or units not clearly listed or inherent to such a process, method, product, or device. In addition, "and/or" used in the specification and claims means at least one of connected objects. For example, A and/or B represents the following three cases: Only A exists, only B exists, and both A and B exist.

In the embodiments of the present disclosure, the term such as "exemplary" or "for example" is used to represent giving an example, an illustration, or a description. Any embodiment or design scheme described as "exemplary" or "for example" in the embodiments of the present disclosure should not be construed as being more preferred or advantageous than other embodiments or design schemes. To be precise, the use of the term such as "exemplary" or "for example" is intended to present a related concept in a specific manner.

A technology described in this specification is not limited to a long term evolution (LTE)/LTE-advanced (LTE-A) system, and may also be used in various types of wireless communications systems, such as a code division multiple access (CDMA) system, a time division multiple access (TDMA) system, a frequency division multiple access (FDMA) system, an orthogonal frequency division multiple access (OFDMA) system, a single-carrier frequency-division multiple access (SC-FDMA) system, and other systems, for example, a fifth generation mobile communications system and a subsequent evolved communications system (for example, another scenario in which there is a design requirement of a random access channel (RACH) counter).

The terms "system" and "network" are usually used interchangeably. A CDMA system may implement a radio technology such as CDMA2000 or universal terrestrial radio access (UTRA). UTRA includes wideband CDMA (WCDMA) and another CDMA variant. A TDMA system may implement a radio technology such as a global system for mobile communications (GSM). An OFDMA system may implement a radio technology such as ultra mobile broadband (UMB), evolved UTRA E-UTRA), IEEE 802.11 (Wi-Fi), IEEE 802.16 (WiMAX), IEEE 802.20, or Flash-OFDM. UTRA and E-UTRA are parts of a universal mobile telecommunications system (UMTS). LTE and evolved LTE (such as LTE-A) are a new UMTS release using E-UTRA. UTRA, E-UTRA, UMTS, LTE, LTE-A, and GSM are described in documents from an organization named the "3rd generation partnership project" (3GPP). CDMA2000 and UMB are described in documents from an organization named the "3rd generation partnership project 2" (3GPP2). The technology described in the present disclosure may be used in the foregoing systems and radio technologies, and may also be used in another system and radio technology.

To better understand the technical solutions of the embodiments of the present disclosure, the following technical points are first described:

I. In an LTE system, a preamble transmission counter (PREAMBLE_TRANSMISSION_COUNTER) is used to perform statistics on a number of retransmissions of a preamble and perform statistics on power ramping.

(1) Each time a random access process is initialized, the preamble transmission counter is reset, and the preamble transmission counter counts 1.

(2) When a second message (msg2) (that is, a random access response (RAR)) is not correctly received, and no power ramping suspension sent from a bottom layer is received, a count value of the preamble transmission counter is increased by 1.

(3) When contention resolution fails, and no power ramping suspension sent from the bottom layer is received, a count value of the preamble transmission counter is increased by 1.

In the foregoing process, if the preamble transmission counter reaches a maximum number of sending times of the preamble plus 1, a random access problem is indicated, to an upper layer, on a medium access control (MAC) layer.

A power for sending the preamble each time is calculated according to the preamble transmission counter and a power ramping step according to the following formula:

Set PREAMBLE_RECEIVED_TARGET_POWER to
preambleInitialReceivedTargetPower+DELTA_PREAMBLE+(PREAMBLE_TRANSMISSION_COUNTER−1)*powerRampingStep,
where "PREAMBLE_RECEIVED_TARGET_POWER" represents a target preamble transmit power, "preambleInitialReceivedTargetPower" represents an initial preamble transmit power, "DELTA_PREAMBLE" represents a power offset, which is related to a format of a preamble.

II. In a 5G NR system, a preamble transmission counter is used to perform statistics on a number of retransmissions of preambles, and a preamble power ramping counter (PREAMBLE_POWER_RAMPING_COUNTER) is used to perform statistics on power ramping.

(1) Each time a random access process is initialized, the preamble transmission counter and the preamble power ramping counter are reset to 1.

(2) When a preamble is retransmitted, if a selected synchronization signal block (SSB) resource is the same as an SSB resource that is previously used for the preamble, a count value of the preamble transmission counter and a count value of the preamble power ramping counter are each increased by 1.

(3) A power for sending the preamble each time is calculated according to the preamble transmission counter, the preamble power ramping counter, and a preamble power ramping step according to the following formula:

Set PREAMBLE_RECEIVED_TARGET_POWER to
preambleReceivedTargetPower+DELTA_PREAMBLE+(PREAMBLE_POWER_RAMPING_COUNTER−1)×PREAMBLE_POWER_RAMPING_STEP,
where "PREAMBLE_POWER_RAMPING_STEP" represents the preamble power ramping step.

Figure 1:
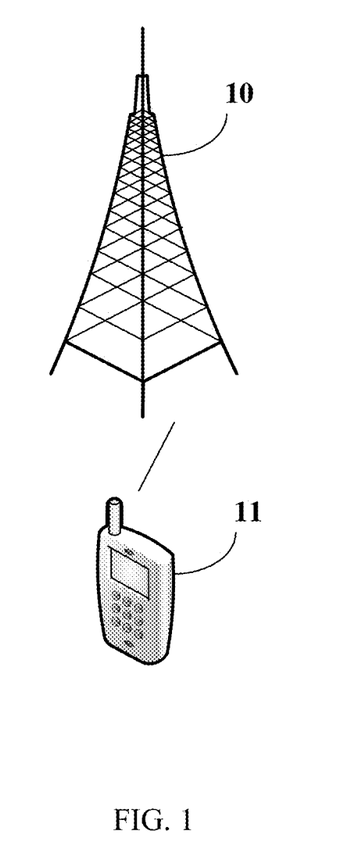
FIG. 1 is a schematic architectural diagram of a wireless communications system according to an embodiment of the present disclosure.
Figure 2:
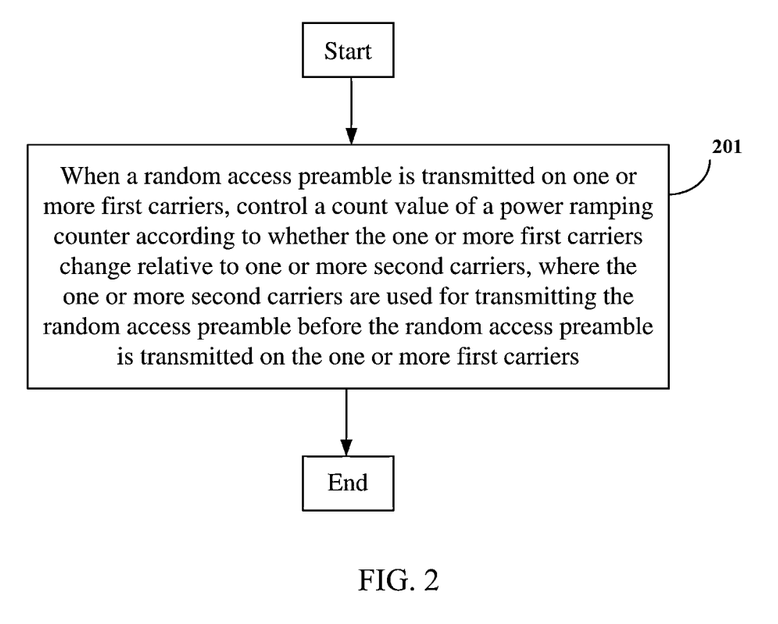
FIG. 2 is a flowchart of a processing method according to an embodiment of the present disclosure.

Referring to FIG. 2, an embodiment of the present disclosure provides a processing method. The method may be performed by a terminal, and includes the following steps:

Step 201: When a random access preamble is transmitted on one or more first carriers, control a count value of a power ramping counter according to whether the one or more first carriers change relative to one or more second carriers, where the one or more second carriers are used for transmitting the preamble before the preamble is transmitted on the one or more first carriers.

In step 201, the count value of the power ramping counter may be controlled when the one or more first carriers change relative to the one or more second carriers, or the count value of the power ramping counter may alternatively be controlled when the one or more first carriers do not change relative to the one or more second carriers.

The first carrier and the second carrier may be a same reference signal (RS) or beam (beam) or different reference signals or beams. The beam may also be referred to as a spatial domain transmission filter.

It may be understood that, in this embodiment of the present disclosure, the reference signal may be a synchronization signal block (SSB), a channel state information reference signal (CSI-RS), a demodulation reference signal (DMRS), or another newly defined reference signal.

In this embodiment of the present disclosure, optionally, the method may further include: after the preamble is transmitted on the one or more second carriers, if the terminal does not receive a random access response within a first preset time, retransmitting the preamble on the one or more first carriers; or after the preamble is transmitted on the one or more second carriers, if the terminal does not successfully complete contention resolution before a preset timer expires, retransmitting the preamble on the one or more first carriers.

The first preset time may be a random access response window (RAR window). Certainly, this is not limited herein.

The preset timer may be a timer used for random access contention (ra-ContentionResolutionTimer).

In this embodiment of the present disclosure, optionally, when the preamble is transmitted on the one or more first carriers, after the controlling a count value of a power ramping counter according to whether the one or more first carriers change relative to one or more second carriers, the method further includes:

if the terminal receives a random access response within a second preset time, performing subsequent random access processing. The subsequent random access processing is a related art, and details are not described herein.

In this embodiment of the present disclosure, optionally, when the preamble is transmitted on the one or more first carriers, the controlling a count value of a power ramping counter according to whether the one or more first carriers change relative to one or more second carriers includes:

when the preamble is transmitted on the one or more first carriers, when a first preset condition is met, controlling the count value of the power ramping counter to be increased by 1, where the first preset condition includes at least one of:

(1) a type of the one or more first carriers used for transmitting the preamble is different from a type of the one or more second carriers used for transmitting the preamble, where a difference between the foregoing types includes: a change between reference signal types or beam types, for example, a width change, that is, a change between a wide beam and a narrow beam, or a change between reference signal types, for example, a change between an SSB and a CSI-RS;

(2) a scanning sequence of the one or more first carriers used for transmitting the preamble is different from a scanning sequence of the one or more second carriers used for transmitting the preamble;

(3) a number of the first carriers used for transmitting the preamble is different from a number of the second carriers used for transmitting the preamble; or (4) the first first carrier in a set of the first carriers used for transmitting the preamble is different from any second carrier in a set of the second carriers used for transmitting the preamble.

In this embodiment of the present disclosure, optionally, when the preamble is transmitted on the one or more first carriers, when a second preset condition is met, a count value of a power ramping counter corresponding to the first carrier is controlled to be increased by 1, where the second preset condition includes at least one of:

(1) a count value of a power ramping counter corresponding to the second carrier used each time the preamble is transmitted is increased by 1;

(2) types of the second carrier and the first carrier that are respectively used when the preamble is transmitted at two continuous times are the same, or types of the second carrier and the first carrier that are respectively used when the preamble is transmitted at two continuous times are different; or (3) a set of the first carriers used for transmitting the preamble is different from a set of the second carriers used for transmitting the preamble, where for each first carrier, each type of first carriers, or a preset number of first carriers, a transmit power of the preamble is controlled by using a count value of one power ramping counter.

For example, (a) the number of the first carriers in the set of the first carriers used for transmitting the preamble is different from the number of the second carriers in the set of the second carriers used for transmitting the preamble, or (b) the type of the first carriers in the set of the first carriers used for transmitting the preamble is different from the type of the second carriers in the set of the second carriers used for transmitting the preamble, or (c) the scanning sequence of the first carriers in the set of the first carriers used for transmitting the preamble is different from the scanning sequence of the second carriers in the set of the second carriers used for transmitting the preamble, or (d) the first carrier in the set of the first carriers used for transmitting the preamble is different from the second carrier in the set of the second carriers used for transmitting the preamble.

In this embodiment of the present disclosure, optionally, that the first first carrier in a set of the first carriers is different from any second carrier in a set of the second carriers includes any one of the following:

(1) a type of the first first carrier in the set of the first carriers is different from a type of any second carrier in the set of the second carriers; and (2) the first first carrier in the set of the first carriers and any second carrier in the set of the second carriers are different carriers of a same type.

The any second carrier in the set of the second carriers may be the first second carrier or the last second carrier or a preset second carrier in the set of the second carriers.

In this embodiment of the present disclosure, optionally, the retransmitting the preamble on the one or more first carriers includes:

controlling, according to a count value of one power ramping counter, a transmit power for retransmitting the preamble on each first carrier; or controlling, according to a count value of one power ramping counter, a transmit power for retransmitting the preamble on each type of first carriers; or controlling, according to a count value of one power ramping counter, a transmit power for retransmitting the preamble on a preset number of first carriers.

It may be understood that a specific value of the preset number is not limited in this embodiment of the present disclosure.

In this embodiment of the present disclosure, optionally, transmitting the preamble on the one or more second carriers and transmitting the preamble on the one or more first carriers refer to at least one of:

(1) transmitting the preamble at two continuous times;
(2) retransmitting the preamble at two continuous times; or
(3) transmitting the preamble and retransmitting the preamble.

In the embodiments of the present disclosure, the count value of the power ramping counter can be controlled according to whether carriers corresponding to sending of multiple preambles change (including change and not change), to improve communication reliability.

The following describes procedures of processing methods in the embodiments of the present disclosure with reference to an example 1 and an example 2. In the example 1, a procedure of a processing method in which counting is performed on all reference signals is described. In the example 2, a procedure of a processing method in which counting is independently performed on each reference signal is described. It may be understood that a statistics manner of beams is similar thereto, and details are not described herein.

Example 1

In this example, steps of a random access method are as follows:

Step 1: A terminal transmits a preamble on one or more reference signals (or beams).

Step 2: If the terminal does not receive a random access response (Random Access Response, RAR) within a preset time (for example, a random access response window (RAR window)), retransmit the preamble on the one or more reference signals (or beams); or if the terminal does not successfully complete contention resolution before a preset timer (for example, a timer used for random access contention (ra-ContentionResolutionTimer)) expires, retransmit the preamble on the one or more reference signals (or beams).

Step 3: When the terminal receives a RAR within the preset time, the terminal performs a subsequent operation step (for example, a subsequent random access step).

When the preamble is retransmitted, similar to that in a related art, one power ramping counter may be used to perform counting to control a power for sending the preamble. Initialization of the power ramping counter may be consistent with that in the related art, and details are not described herein.

In step 2, when the preamble is retransmitted, when at least one of the following conditions is met, a count value of the power ramping counter is increased by 1:
  (1) one or more reference signals used for transmitting the preamble change compared with that/those used when the preamble is previously transmitted;
  (2) a type or types of one or more reference signals used for transmitting the preamble changes/change compared with that/those used when the preamble is previously transmitted;
  (3) a scanning sequence of one or more reference signals used for transmitting the preamble changes compared with that used when the preamble is previously transmitted;
  (4) a number of reference signals used for transmitting the preamble changes compared with that used when the preamble is previously transmitted; or
  (5) the first reference signal in a reference signal set used for transmitting the preamble is different from any reference signal (for example, the first reference signal, the last reference signal, or a preset reference signal) in a reference signal set used when the preamble is previously transmitted, where that the reference signals are different may mean that the reference signals are different types of reference signals, or may mean that the reference signals are different reference signals of a same type.

In the embodiments of the present disclosure, the count value of the power ramping counter can be controlled according to change statuses (including change and not change) of carriers (for example, a reference signal, a beam, or a spatial domain transmission filter) corresponding to sending of the multiple preambles, to improve communication reliability.

Example 2

In this example, steps of a random access method are as follows:

Step 1: A terminal transmits a preamble on one or more reference signals (or beams).

Step 2: If the terminal does not receive a RAR within a preset time (for example, a RAR window), retransmit the preamble on the one or more reference signals (or beams); or if the terminal does not successfully complete contention resolution before a preset timer (for example, ra-ContentionResolutionTimer) expires, retransmit the preamble on the one or more reference signals (or beams).

Step 3: When the terminal receives a RAR within the preset time, the terminal performs a subsequent operation step.

When the preamble is retransmitted, on each reference signal or each type of reference signals or a preset number of reference signals, one power ramping counter is used to perform counting to control a power for sending the preamble. Initialization of the power ramping counter may be consistent with that in a related art, and details are not described herein.

In step 2, when the preamble is retransmitted, when at least one of the following conditions is met, a count value of the power ramping counter is increased by 1:
  (1) a count value of a power ramping counter on a reference signal used each time the preamble is transmitted is increased by 1;
  (2) types of reference signals respectively used when the preamble is transmitted at two continuous times do not change;
  (3) types of reference signals respectively used when the preamble is transmitted at two continuous times change; or
  (4) one or more reference signals in a preset number of reference signals used for transmitting the preamble change, where that the reference signal changes includes that any one of the following changes: a number of reference signals, a type of the reference signals, a scanning sequence of the reference signals, and a reference signal.

It should be noted that, in the foregoing example 1 and example 2, transmission of the preamble performed at two continuous times may be any one of the following:
  (1) transmission of the preamble performed at two continuous times between which a round of beam scanning is performed;
  (2) repeat (repetition) transmission of the preamble performed at two continuous times; and
  (3) transmission and retransmission of the preamble.

In the embodiments of the present disclosure, the count value of the power ramping counter can be controlled according to whether carriers corresponding to sending of multiple preambles change (including change and not change), to improve communication reliability.

The embodiments of the present disclosure further provide a terminal. A problem resolution principle of the terminal is similar to that of the processing method in the embodiments of the present disclosure. Therefore, for implementation of the terminal, refer to the implementation of the method. Repetitions are not provided herein.

Figure 3:
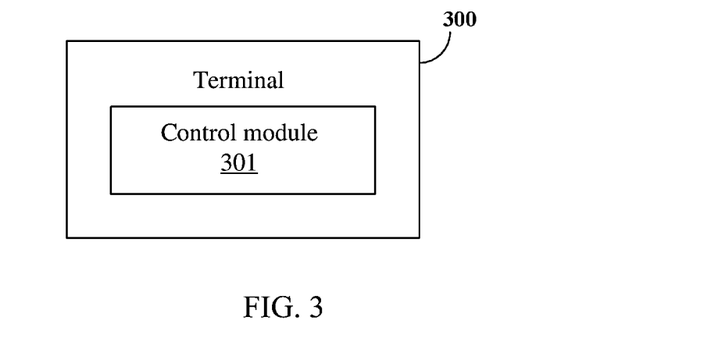
FIG. 3 is a first schematic structural diagram of a terminal according to an embodiment of the present disclosure.

Referring to FIG. 3, an embodiment of the present disclosure further provides a terminal. The terminal 300 includes:
  a control module 301, configured to: when a random access preamble is transmitted on one or more first carriers, control a count value of a power ramping counter according to whether the one or more first carriers change relative to one or more second carriers, where
  the one or more second carriers are used for transmitting the preamble before the preamble is transmitted on the one or more first carriers.

In this embodiment of the present disclosure, optionally, the terminal further includes:
  a retransmission module, configured to: after the preamble is transmitted on the one or more second carriers, if the terminal does not receive a random access response within a first preset time, retransmit the preamble on the one or more first carriers; or after the preamble is transmitted on the one or more second carriers, if the terminal does not successfully complete contention resolution before a preset timer expires, retransmit the preamble on the one or more first carriers.

In this embodiment of the present disclosure, optionally, the terminal further includes:

a processing module, configured to: when the preamble is transmitted on the one or more first carriers, after the count value of the power ramping counter is controlled according to whether the one or more first carriers change relative to the second carrier, if the terminal receives a random access response within a second preset time, perform subsequent random access processing.

In this embodiment of the present disclosure, optionally, the control module is further configured to: when the preamble is transmitted on the one or more first carriers, when a first preset condition is met, control the count value of the power ramping counter to be increased by 1, where the first preset condition includes at least one of:

(1) a type of the one or more first carriers used for transmitting the preamble is different from a type of the one or more second carriers used for transmitting the preamble, where a difference between the foregoing types includes: a change between beam types, for example, a width change, or a change between reference signal types, for example, a change between an SSB and a CSI-RS;

(2) a scanning sequence of the one or more first carriers used for transmitting the preamble is different from a scanning sequence of the one or more second carriers used for transmitting the preamble;

(3) a number of the first carriers is different from a number of the second carriers; or (4) the first first carrier in a set of the first carriers is different from any second carrier in a set of the second carriers.

In this embodiment of the present disclosure, optionally, the control module is further configured to: when the preamble is transmitted on the one or more first carriers, when a second preset condition is met, control a count value of a power ramping counter corresponding to the first carrier to be increased by 1, where the second preset condition includes at least one of:

(1) a count value of a power ramping counter corresponding to the second carrier used each time the preamble is transmitted is increased by 1;

(2) types of the second carrier and the first carrier that are respectively used when the preamble is transmitted at two continuous times are the same, or types of the second carrier and the first carrier that are respectively used when the preamble is transmitted at two continuous times are different; or (3) a set of the first carriers used for transmitting the preamble is different from a set of the second carriers used for transmitting the preamble, where for each first carrier, each type of first carriers, or a preset number of first carriers, a transmit power of the preamble is controlled by using a count value of one power ramping counter.

In this embodiment of the present disclosure, optionally, that the first first carrier in a set of the first carriers is different from any second carrier in a set of the second carriers includes any one of the following:

a type of the first first carrier in the set of the first carriers is different from a type of any second carrier in the set of the second carriers; and the first first carrier in the set of the first carriers and any second carrier in the set of the second carriers are different carriers of a same type.

In this embodiment of the present disclosure, optionally, the retransmission module is further configured to:

control, according to a count value of one power ramping counter, a transmit power for retransmitting the preamble on each first carrier; or control, according to a count value of one power ramping counter, a transmit power for retransmitting the preamble on each type of first carriers; or control, according to a count value of one power ramping counter, a transmit power for retransmitting the preamble on a preset number of first carriers.

In this embodiment of the present disclosure, optionally, transmitting the preamble on the one or more second carriers and transmitting the preamble on the one or more first carriers refer to at least one of:

transmitting the preamble at two continuous times;

retransmitting the preamble at two continuous times; or transmitting the preamble and retransmitting the preamble.

In this embodiment of the present disclosure, optionally, the first carrier and the second carrier are a same reference signal or beam or are different reference signals or beams.

The terminal provided in this embodiment of the present disclosure may perform the foregoing method embodiment. An implementation principle and a technical effect of the terminal are similar thereto, and details are not described herein in this embodiment.

Figure 4:
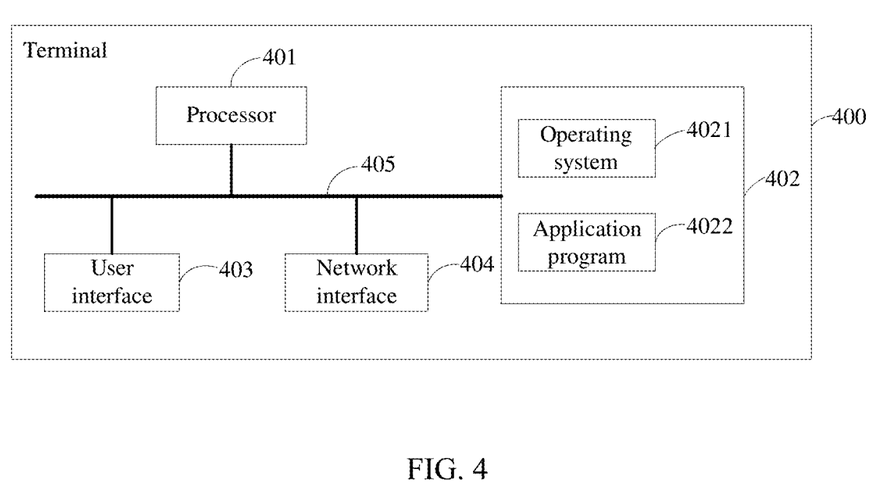
FIG. 4 is a second schematic structural diagram of a terminal according to an embodiment of the present disclosure.

As shown in FIG. 4, a terminal 400 shown in FIG. 4 includes: at least one processor 401, a memory 402, at least one network interface 404, and a user interface 403. Various components of the terminal 400 are coupled by using a bus system 405. It may be understood that the bus system 405 is used to implement connection communication between these components. In addition to including a data bus, the bus system 405 further includes a power supply bus, a control bus, and a status signal bus. However, for clear description, various types of buses are all represented as the bus system 405 in FIG. 4.

The user interface 403 may include a display, a keyboard, or a click device (for example, a mouse, a trackball, a touch panel, or a touch screen).

It may be understood that the memory 402 in this embodiment of the present disclosure may be a volatile memory or a non-volatile memory, or may include both a volatile memory and a non-volatile memory. The volatile memory may be a read-only memory (Read-Only Memory, ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example rather than limitative description, many forms of RAMs are available, such as a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchlink dynamic random access memory (SLDRAM), and a direct rambus random access memory (DRRAM). The memory 402 of the system and the method described in the embodiments of the present disclosure is intended to include, but is not limited to, these and any other suitable types of memories.

In some implementations, the memory 402 stores the following elements: executable modules, or data structures, or subsets or extended sets thereof, namely, an operating system 4021 and an application program 4022.

The operating system 4021 includes various system programs, such as on a framework layer, a core library layer, and a driver layer, and is configured to: implement various basic services and process hardware-based tasks. The application program 4022 includes various application programs, such as a media player and a browser, and is configured to implement various application services. A program for implementing the method of the embodiments of the present disclosure may be included in the application program 4022.

In an embodiment of the present disclosure, a program or an instruction, which may be specifically a program or an instruction stored in the application program 4022, stored in the memory 402, is invoked, to implement the following steps during execution: when a random access preamble is transmitted on one or more first carriers, controlling a count value of a power ramping counter according to whether the one or more first carriers change relative to one or more second carriers, where the one or more second carriers are used for transmitting the preamble before the preamble is transmitted on the one or more first carriers.

The terminal provided in this embodiment of the present disclosure may perform the foregoing method embodiment. An implementation principle and a technical effect of the terminal are similar thereto, and details are not described herein in this embodiment.

The method or algorithm steps described in combination with content disclosed in the present disclosure may be implemented by hardware, or may be implemented by a processor by executing software instructions. The software instructions may include corresponding software modules, and the software modules may be stored in a RAM, a flash memory, a ROM, an EPROM, an EEPROM, a register, a hard disk, a mobile hard disk, a compact-disk read-only memory, or any other form of storage medium known in the art. An exemplary storage medium is coupled to the processor, so that the processor can read information from the storage medium and can write information to the storage medium. Certainly, the storage medium may also be an integral part of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, functions described in the present disclosure may be implemented by hardware, software, firmware, or any combination thereof. When implemented by software, the foregoing functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any usable medium accessible to a general-purpose or dedicated computer.

The objectives, technical solutions, and beneficial effects of the present disclosure are further described in detail in the foregoing specific implementations. It should be understood that the foregoing descriptions are merely specific implementations of the present disclosure, and are not intended to limit the protection scope of the present disclosure. Any modification, equivalent replacement, or improvement made on the basis of the technical solutions of the present disclosure shall fall within the protection scope of the present disclosure.

A person skilled in the art should understand that the embodiments of the present disclosure can be provided as a method, a system, or a computer program product. Therefore, the embodiments of the present disclosure may take the form of a hardware only embodiment, a software only embodiment, or an embodiment with both software and hardware. Moreover, the embodiments of the present disclosure may adopt a form of a computer program product implemented on one or more computer-usable storage media (including but not limited to a magnetic disk memory, a CD-ROM, and an optical storage) containing computer-usable program code.

The embodiments of the present disclosure are described with reference to the flowcharts and/or block diagrams of the methods, devices (systems), and computer program products according to the embodiments of the present disclosure. It should be understood that each process and/or block in the flowchart and/or block diagram as well as a combination of processes and/or blocks in the flowchart and/or block diagram may be implemented by computer program instructions. These computer program instructions may be provided to a processor of a general-purpose computer, a dedicated computer, an embedded processor, or another programmable data processing device to produce a machine, so that instructions executed by a processor of a computer or another programmable data processing device produce an apparatus for implementing a function specified in one or more processes of the flowchart and/or one or more blocks of the block diagram.

These computer program instructions may also be stored in a computer-readable memory that can instruct a computer or another programmable data processing device to work in a specific manner, so that an instruction stored in the computer-readable memory generates a product including an instruction apparatus, and the instruction apparatus implements a function specified in one or more processes of the flowchart and/or one or more blocks of the block diagram.

These computer program instructions may also be loaded onto a computer or another programmable data processing device, so that a series of operation steps are performed on the computer or the another programmable device to produce computer-implemented processing, thereby providing instructions executed on the computer or the another programmable device to implement the function specified in one or more processes of the flowchart and/or one or more blocks of the block diagram.

Obviously, a person skilled in the art can make various modifications and variations to the embodiments of the present disclosure without departing from the spirit and scope of the present disclosure. In this way, the present disclosure is intended to include these modifications and variations of the embodiments of the present disclosure provided that they fall within the scope of the claims of the present disclosure and their equivalent technologies.

What is claimed is:

1. A method for controlling a power ramping counter, applied to a terminal and comprising:
   determining that a random access preamble is transmitted on one or more first carriers; and
   in response to the random access preamble being transmitted on the one or more first carriers, controlling a count value of the power ramping counter according to whether the one or more first carriers change relative to one or more second carriers, wherein the one or more second carriers are used for transmitting the preamble before the preamble is transmitted on the one or more first carriers; and the controlling the count value of the power ramping counter according to whether the one or more first carriers change relative to the one or more second carriers comprises:

determining that a first preset condition is met; and in response to the first preset condition being met, controlling the count value of the power ramping counter to be increased by 1, wherein the first preset condition comprises at least one of:

a type of the one or more first carriers used for transmitting the preamble is different from a type of the one or more second carriers used for transmitting the preamble;

a scanning sequence of the one or more first carriers used for transmitting the preamble is different from a scanning sequence of the one or more second carriers used for transmitting the preamble; or a number of the first carriers used for transmitting the preamble is different from a number of the second carriers used for transmitting the preamble;

or determining that a second preset condition is met; and in response to the second preset condition being met, controlling the count value of a power ramping counter corresponding to the first carrier to be increased by 1, wherein the second preset condition comprises:

types of the second carrier and the first carrier that are respectively used when the preamble is transmitted at two continuous times are different.

2. The method according to claim 1, further comprising:

after the preamble is transmitted on the one or more second carriers, if the terminal does not receive a random access response within a first preset time, retransmitting the preamble on the one or more first carriers; or after the preamble is transmitted on the one or more second carriers, if the terminal does not successfully complete contention resolution before a preset timer expires, retransmitting the preamble on the one or more first carriers.

3. The method according to claim 1, wherein after the controlling the count value of the power ramping counter according to whether the one or more first carriers change relative to one or more second carriers, the method further comprises:

if the terminal receives a random access response within a second preset time, performing subsequent random access processing.

4. The method according to claim 2, wherein the retransmitting the preamble on the one or more first carriers comprises:

controlling, according to the count value of the power ramping counter, a transmit power for retransmitting the preamble on each first carrier; or controlling, according to the count value of the power ramping counter, a transmit power for retransmitting the preamble on each type of first carriers; or controlling, according to the count value of the power ramping counter, a transmit power for retransmitting the preamble on a preset number of first carriers.

5. The method according to claim 1, wherein transmitting the preamble on the one or more second carriers and transmitting the preamble on the one or more first carriers refer to at least one of:

transmitting the preamble at two continuous times;

retransmitting the preamble at two continuous times; or transmitting the preamble and retransmitting the preamble.

6. The method according to claim 1, wherein the first carrier and the second carrier are reference signals or beams.

7. A terminal, comprising: a processor, a memory, and a program that is stored in the memory and executable on the processor; wherein the program, when executed by the processor, causes the terminal to perform:

when a random access preamble is transmitted on one or more first carriers, controlling a count value of a power ramping counter according to whether the one or more first carriers change relative to one or more second carriers, wherein the one or more second carriers are used for transmitting the preamble before the preamble is transmitted on the one or more first carriers; and the terminal performs:

when the preamble is transmitted on the one or more first carriers, when a first preset condition is met, controlling the count value of the power ramping counter to be increased by 1, wherein the first preset condition comprises at least one of:

a type of the one or more first carriers used for transmitting the preamble is different from a type of the one or more second carriers used for transmitting the preamble;

a scanning sequence of the one or more first carriers used for transmitting the preamble is different from a scanning sequence of the one or more second carriers used for transmitting the preamble; or a number of the first carriers used for transmitting the preamble is different from a number of the second carriers used for transmitting the preamble;

or when the preamble is transmitted on the one or more first carriers, when a second preset condition is met, controlling the count value of the power ramping counter corresponding to the first carrier to be increased by 1, wherein the second preset condition comprises:

types of the second carrier and the first carrier that are respectively used when the preamble is transmitted at two continuous times are different.

8. The terminal according to claim 7, wherein the terminal further performs:

after the preamble is transmitted on the one or more second carriers, if the terminal does not receive a random access response within a first preset time, retransmitting the preamble on the one or more first carriers; or after the preamble is transmitted on the one or more second carriers, if the terminal does not successfully complete contention resolution before a preset timer expires, retransmitting the preamble on the one or more first carriers.

9. The terminal according to claim 7, wherein when the preamble is transmitted on the one or more first carriers, after the controlling the count value of the power ramping counter according to whether the one or more first carriers change relative to one or more second carriers, the terminal further performs:
  if the terminal receives a random access response within a second preset time, performing subsequent random access processing.

10. The terminal according to claim 8, wherein the terminal performs:
  controlling, according to the count value of the power ramping counter, a transmit power for retransmitting the preamble on each first carrier; or
  controlling, according to the count value of the power ramping counter, a transmit power for retransmitting the preamble on each type of first carriers; or
  controlling, according to the count value of the power ramping counter, a transmit power for retransmitting the preamble on a preset number of first carriers.

11. The terminal according to claim 7, wherein transmitting the preamble on the one or more second carriers and transmitting the preamble on the one or more first carriers refer to at least one of:
  transmitting the preamble at two continuous times;
  retransmitting the preamble at two continuous times; or
  transmitting the preamble and retransmitting the preamble.

12. The terminal according to claim 7, wherein the first carrier and the second carrier are reference signals or beams.

13. A non-transitory computer-readable storage medium, wherein the non-transitory computer-readable storage medium stores a computer program; the computer program, when executed by a processor, causes the processor to perform:
  when a random access preamble is transmitted on one or more first carriers, controlling a count value of a power ramping counter according to whether the one or more first carriers change relative to one or more second carriers, wherein
  the one or more second carriers are used for transmitting the preamble before the preamble is transmitted on the one or more first carriers; and
  the processor performs:
    when the preamble is transmitted on the one or more first carriers, when a first preset condition is met, controlling the count value of the power ramping counter to be increased by 1, wherein the first preset condition comprises at least one of:
      a type of the one or more first carriers used for transmitting the preamble is different from a type of the one or more second carriers used for transmitting the preamble;
      a scanning sequence of the one or more first carriers used for transmitting the preamble is different from a scanning sequence of the one or more second carriers used for transmitting the preamble; or
      a number of the first carriers used for transmitting the preamble is different from a number of the second carriers used for transmitting the preamble;
    or
    when the preamble is transmitted on the one or more first carriers, when a second preset condition is met, controlling the count value of the power ramping counter corresponding to the first carrier to be increased by 1, wherein the second preset condition comprises:
      types of the second carrier and the first carrier that are respectively used when the preamble is transmitted at two continuous times are different.

14. The non-transitory computer-readable storage medium according to claim 13, wherein the processor further performs:
  after the preamble is transmitted on the one or more second carriers, if the terminal does not receive a random access response within a first preset time, retransmitting the preamble on the one or more first carriers; or
  after the preamble is transmitted on the one or more second carriers, if the terminal does not successfully complete contention resolution before a preset timer expires, retransmitting the preamble on the one or more first carriers.

15. The non-transitory computer-readable storage medium according to claim 13, wherein when the preamble is transmitted on the one or more first carriers, after the controlling the count value of the power ramping counter according to whether the one or more first carriers change relative to one or more second carriers, the processor further performs:
  if the terminal receives a random access response within a second preset time, performing subsequent random access processing.

16. The non-transitory computer-readable storage medium according to claim 14, wherein the processor performs:
  controlling, according to the count value of the power ramping counter, a transmit power for retransmitting the preamble on each first carrier; or
  controlling, according to the count value of the power ramping counter, a transmit power for retransmitting the preamble on each type of first carriers; or
  controlling, according to the count value of the power ramping counter, a transmit power for retransmitting the preamble on a preset number of first carriers.

17. The non-transitory computer-readable storage medium according to claim 13, wherein transmitting the preamble on the one or more second carriers and transmitting the preamble on the one or more first carriers refer to at least one of:
  transmitting the preamble at two continuous times;
  retransmitting the preamble at two continuous times; or
  transmitting the preamble and retransmitting the preamble.

18. The non-transitory computer-readable storage medium according to claim 13, wherein the first carrier and the second carrier are reference signals or beams.

* * * * *